United States Patent
Xiong et al.

(10) Patent No.: US 10,875,371 B2
(45) Date of Patent: Dec. 29, 2020

(54) SUSPENSION SYSTEM, AND CHASSIS AND ROBOT WITH THE SAME

(71) Applicant: UBTECH Robotics Corp, Shenzhen (CN)

(72) Inventors: Youjun Xiong, Shenzhen (CN); Kunlei Zhao, Shenzhen (CN); Wenhua Yu, Shenzhen (CN); Libing Zhou, Shenzhen (CN); Hailang Zhou, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 163 days.

(21) Appl. No.: 16/232,059

(22) Filed: Dec. 26, 2018

(65) Prior Publication Data

US 2019/0366787 A1 Dec. 5, 2019

(30) Foreign Application Priority Data

May 30, 2018 (CN) .......................... 2018 1 0537402

(51) Int. Cl.
*B60G 3/01* (2006.01)
*B60K 7/00* (2006.01)

(52) U.S. Cl.
CPC .............. *B60G 3/01* (2013.01); *B60K 7/0007* (2013.01); *B60G 2204/15* (2013.01); *B60G 2204/4232* (2013.01); *B60G 2204/45* (2013.01)

(58) Field of Classification Search
CPC ............ B60K 2007/0038; A61G 5/043; B60L 2220/44; B62D 21/11

USPC ....................................................... 180/65.51
See application file for complete search history.

(56) References Cited

U.S. PATENT DOCUMENTS

| | | | | |
|---|---|---|---|---|
| 2,155,521 A * | 4/1939 | Zavarella | ................. | B60G 3/01 280/124.127 |
| 3,578,354 A * | 5/1971 | Schott | ...................... | B60G 3/01 280/124.126 |
| 7,287,611 B2 * | 10/2007 | Nagaya | ..................... | B60G 3/01 180/65.51 |
| 7,306,247 B2 * | 12/2007 | Wu | ........................ | A61G 5/043 180/65.51 |
| 7,389,999 B2 * | 6/2008 | Kimura | ..................... | B60B 9/06 280/124.125 |
| 7,621,357 B2 * | 11/2009 | Suzuki | ................... | B60G 7/008 180/65.1 |
| 7,721,829 B2 * | 5/2010 | Lee | .......................... | B25J 5/007 180/6.48 |

(Continued)

*Primary Examiner* — Jeffrey J Restifo

(57) ABSTRACT

The present disclosure provides a suspension system, and a chassis with the same. The system includes: a fixing frame having an opening; a suspension frame disposed at the opening; and a driving wheel rotationally coupled to the suspension frame. In which, two ends of the suspension frame are respectively disposed on two ends of the fixing frame at the two sides of the opening to be selectively moved up and down along a height direction of the fixing frame, and two elastic members are respectively disposed between each of the two ends of the suspension frame and the corresponding end of the fixing frame at the two sides of the opening. In the present disclosure, the fixing frame and the suspension frame can move with respect to each other in a vertical direction, and the resetting adjustment is realized through the elastic member.

17 Claims, 6 Drawing Sheets

(56) References Cited

U.S. PATENT DOCUMENTS

| | | | | |
|---|---|---|---|---|
| 7,766,110 | B2* | 8/2010 | Suzuki | B60K 6/48 |
| | | | | 180/65.51 |
| 7,770,677 | B2* | 8/2010 | Takenaka | B60G 3/185 |
| | | | | 180/65.51 |
| 7,789,178 | B2* | 9/2010 | Mizutani | B60K 7/0007 |
| | | | | 180/65.51 |
| 7,938,210 | B2* | 5/2011 | Kunzler | B60G 17/0195 |
| | | | | 180/65.51 |
| 7,958,959 | B2* | 6/2011 | Yogo | B60K 7/0007 |
| | | | | 180/65.51 |
| 8,037,957 | B2* | 10/2011 | Laurent | B60K 17/043 |
| | | | | 180/65.51 |
| 8,210,556 | B2* | 7/2012 | Zhou | A61G 5/043 |
| | | | | 280/304.1 |
| 8,746,383 | B2* | 6/2014 | Basadzishvili | B60G 3/01 |
| | | | | 180/65.51 |
| 9,156,323 | B2* | 10/2015 | Koku | B60G 3/01 |
| 9,340,104 | B2* | 5/2016 | Kanatani | F16H 1/20 |
| 10,131,218 | B2* | 11/2018 | Dolgov | B60K 7/00 |
| 2003/0168264 | A1* | 9/2003 | Goertzen | A61G 5/1089 |
| | | | | 180/65.1 |
| 2005/0247496 | A1* | 11/2005 | Nagaya | B60K 7/0007 |
| | | | | 180/65.51 |
| 2006/0012144 | A1* | 1/2006 | Kunzler | B60G 17/0195 |
| | | | | 280/124.125 |
| 2008/0100021 | A1* | 5/2008 | Yamada | B60G 3/01 |
| | | | | 280/124.127 |
| 2008/0185807 | A1* | 8/2008 | Takenaka | B60G 3/14 |
| | | | | 280/124.153 |
| 2008/0203693 | A1* | 8/2008 | Yamada | B60G 7/008 |
| | | | | 280/124.127 |
| 2011/0209938 | A1* | 9/2011 | Basadzishvili | B60K 7/0007 |
| | | | | 180/305 |

\* cited by examiner

SUSPENSION SYSTEM, AND CHASSIS AND ROBOT WITH THE SAME

CROSS REFERENCE TO RELATED APPLICATIONS

This application claims priority to Chinese Patent Application No. 201810537402.3, filed May 30, 2018, which is hereby incorporated by reference herein as if set forth in its entirety.

BACKGROUND

1. Technical Field

The present disclosure relates to suspension system technology, and particularly to a suspension system and a chassis as well as a robot with the same.

2. Description of Related Art

In the past years, robot technology has developed rapidly, and the service robots with mobile capability have gradually put into commercial practice. Most of these service robots are wheeled robots, which are for receiving and guiding customers. Since they are mostly used on flat grounds in room, a few of them have obstacle-crossing capability. In actual applications, even when they are used in indoor places such as hotels and airports, it is difficult to avoid rough terrain and can not work normally. In order to solve this problem, some service robots are provided with a suspension system to have certain obstacle-crossing capability. However, the existing suspension systems are mostly designed with reference to vehicle suspension systems, which is complicated in structure, high in cost, and unable to adapt to the robots with high gravity center.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

Figure 1:
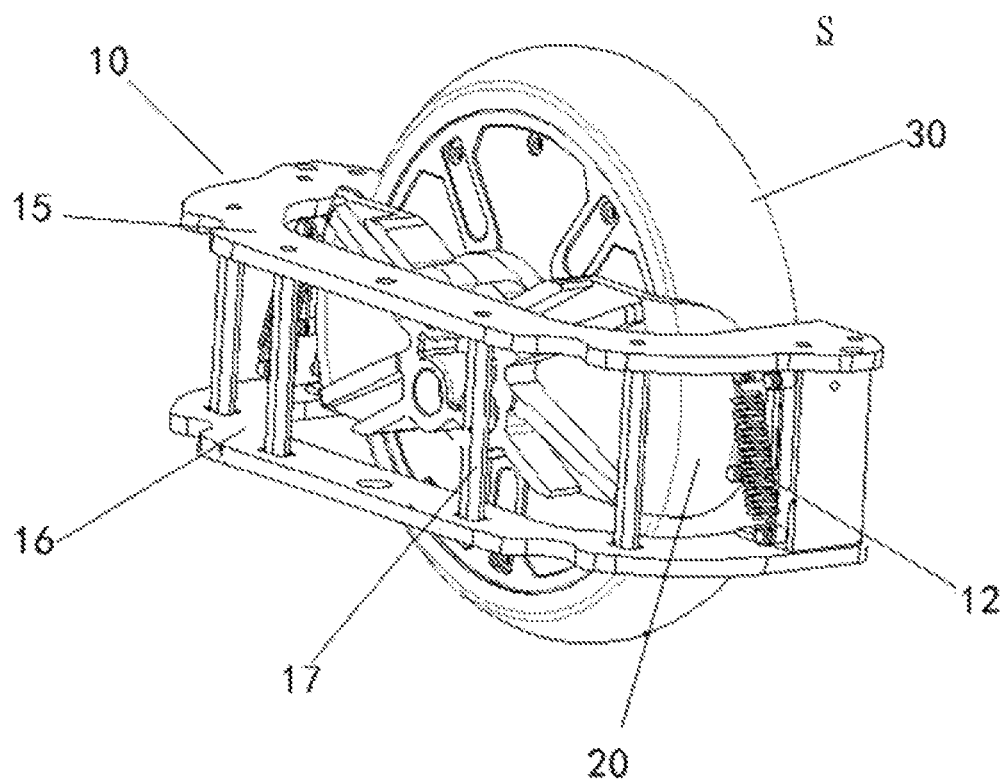
FIG. 1 is a schematic diagram of the structure of a suspension system according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

The embodiments of the present disclosure are described in detail below, and the examples of the embodiments are illustrated in the drawings, in which the same or similar reference numerals are used to refer to the same or similar elements or elements having the same or similar functions. The embodiments described below with reference to the drawings are intended to be illustrative of the present disclosure and should not be comprehended as limitations to the present disclosure.

In the description of the present disclosure, it is to be understood that the orientation or positional relationship indicated by the terms "length", "width", "upper", "lower", "front", "back", "left", "right", "vertical", "horizontal", "top", "bottom", "inside", "outside", and the like are the orientation or positional relationship shown based on the drawings, which is only for the convenience of describing the present disclosure and simplifying the description, rather than indicating or implying that the device or component referred to must have a particular orientation or constructed as well as operated in a particular orientation, therefore should not to be comprehended as limitations.

Moreover, the terms "first" and "second" are used for descriptive purposes only and should not to be comprehended as indicating or implying a relative importance or implying the amount of the indicated technical features. Thus, features defined with "first" and "second" may include one or more of the features either explicitly or implicitly. In the description of the present disclosure, the meaning of "a plurality" is two or more unless specifically defined otherwise.

In the present disclosure, the terms "installed", "connected", "coupled", "fixed" and the like shall be comprehended broadly, for example, may be fixedly connected, a detachably connected, or integrated; may be mechanically connected or electrically connected; may be directly connected or be indirectly connected through an intermediate medium; may be the internal communication of two elements or be the interaction of two elements. For those skilled in the art, the specific meanings of the above-mentioned terms can be comprehended on a case-by-case basis.

Figure 2:
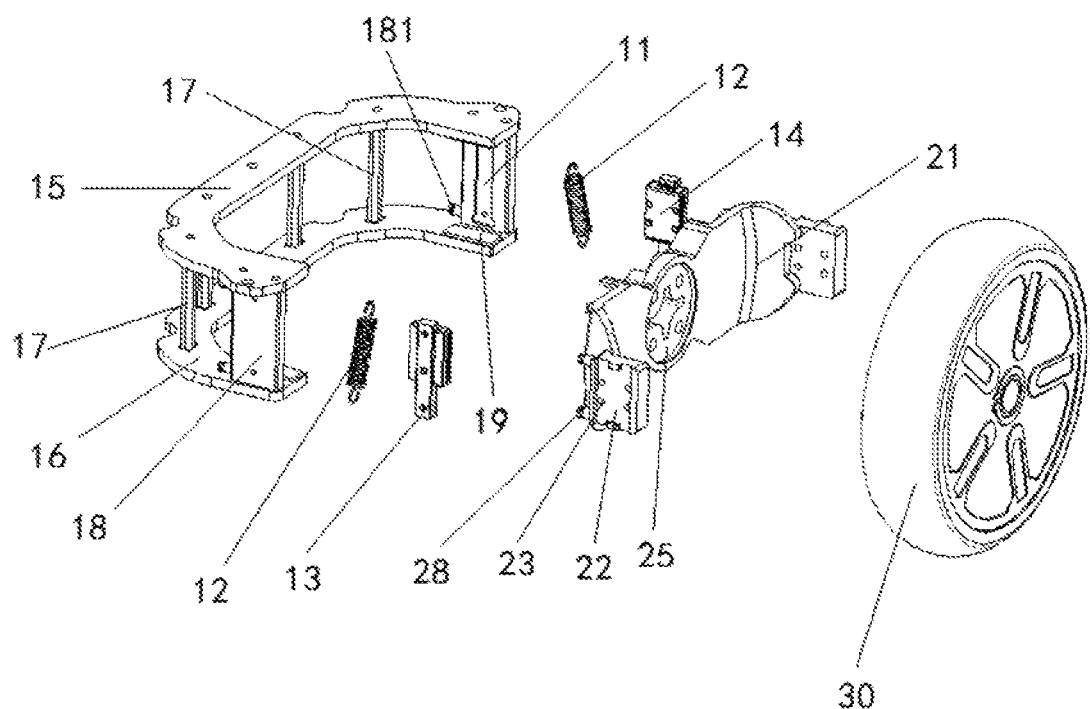
FIG. 2 is a first exploded view of the suspension system of FIG. 1.
Figure 3:
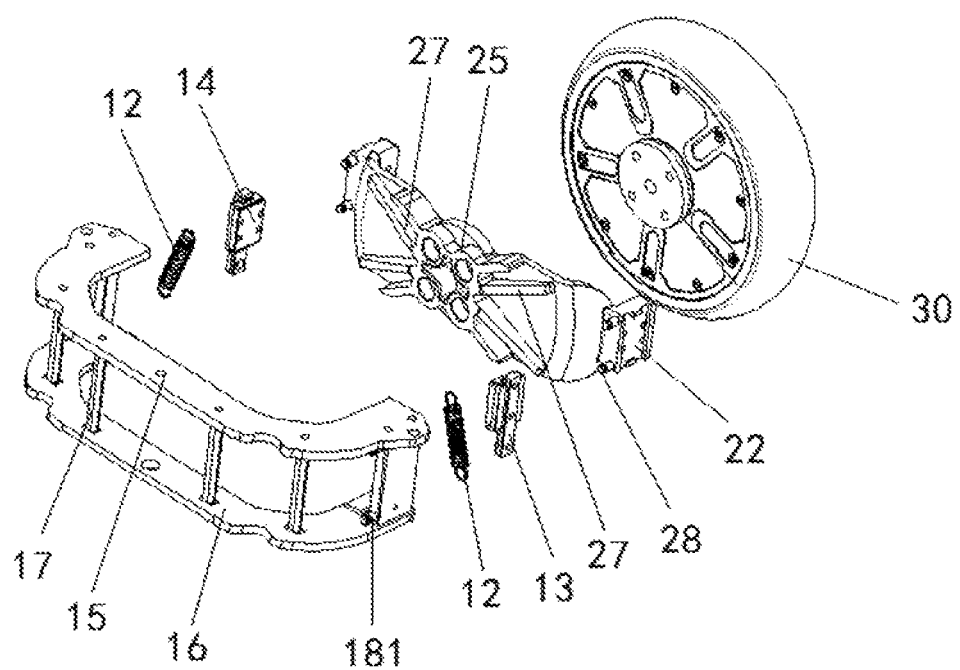
FIG. 3 is a second exploded view of the suspension system of FIG. 1.
Figure 6:
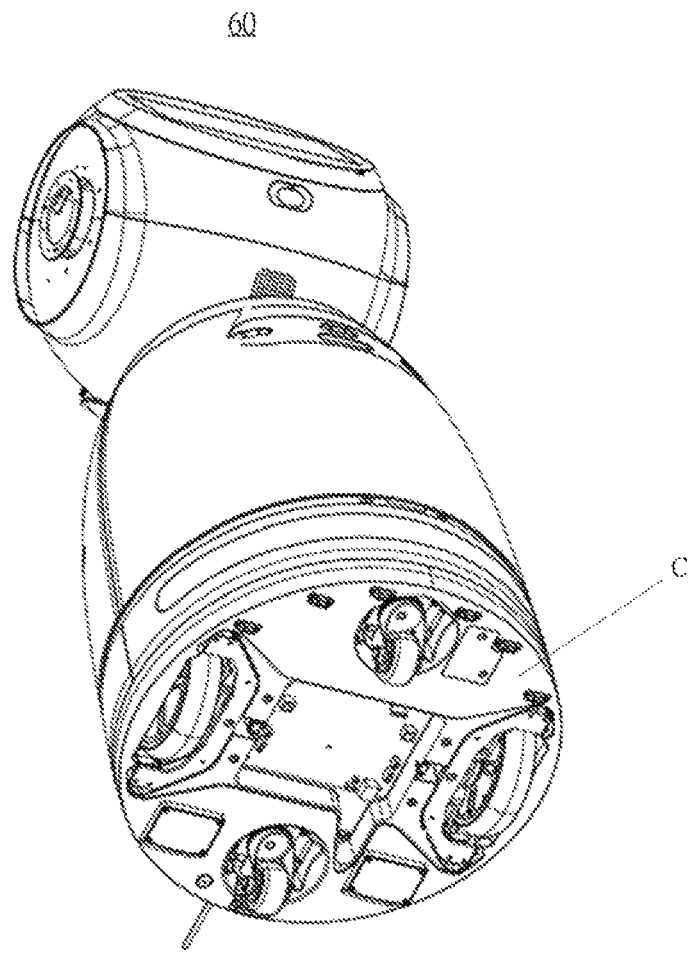
FIG. 6 is a schematic diagram of the structure of a robot according to an embodiment of the present disclosure.

FIG. 1 is a schematic diagram of the structure of a suspension system according to an embodiment of the present disclosure; FIG. 2 is a first exploded view of the suspension system of FIG. 1; and FIG. 3 is a second exploded view of the suspension system of FIG. 1. In this embodiment, the suspension system is applied to a robot 60, as shown in FIG. 6. As shown in FIG. 1-FIG. 3, in this embodiment, a suspension system S includes a fixing frame 10, a suspension frame 20, and a driving wheel 30. In which, the fixing frame 10 is a three-dimensional frame which has a U-shaped cross section, the suspension frame 20 is disposed at an opening of the U-shaped fixing frame 10, and the driving wheel 30 is rotationally coupled to the suspension frame 20. Two ends of the suspension frame 20 are respectively disposed on two ends of the fixing frame 10 at two sides of the opening, which can be selectively moved up and down along a height direction of the fixing frame 10. In this embodiment, each of the two ends of the U-shaped fixing frame 10 at the two sides of the opening is formed with a sliding groove 11. The sliding groove 11 is formed along a height direction of the U-shaped fixing frame 10, that is, the sliding groove 11 is formed vertically, and the two ends of the suspension frame 20 are disposed in the two sliding grooves 11 in a slidable manner. In other embodiments, it is possible not to form the sliding grooves 11 and dispose a sliding structure between the two ends of the suspension frame 20 and the two ends of the fixing frame 10. Two elastic members 12 are respectively disposed between each of the two ends of the suspension frame 20 and the corresponding end of the fixing frame 10 at the two sides of the opening In this embodiment, the adjustment of the relative position between the fixing frame 10 and the suspension frame 20 in a vertical direction is realized through the sliding groove 11 and the elastic member 12. This structure is simple and low in cost. When applied to a chassis of a robot, it makes the robot to move more stable and to be capable of overcoming obstacles so as to adapt to different ground conditions, so that the robot can adapt to more work scenarios.

Figure 4:
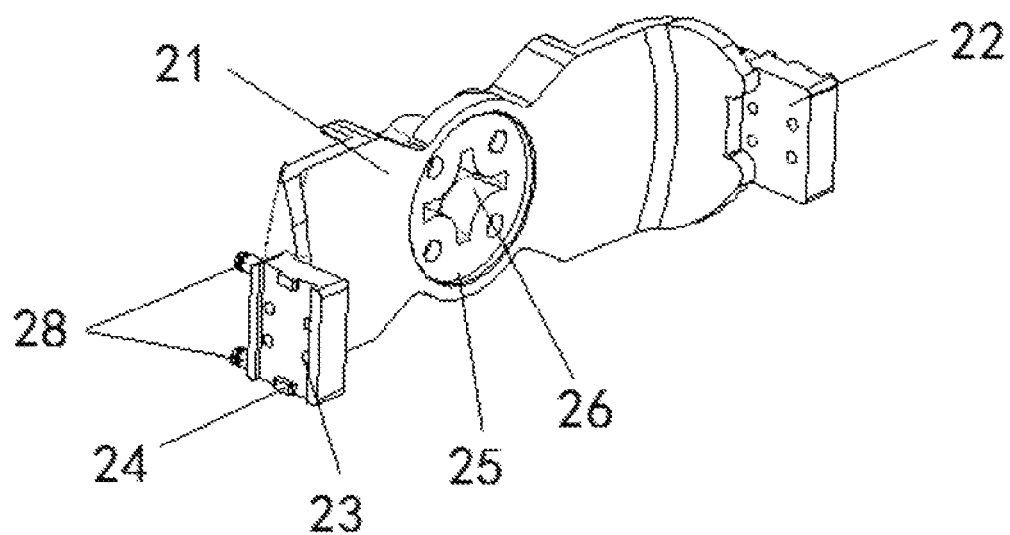
FIG. 4 is a schematic diagram of the structure of a suspension frame of the suspension system of FIG. 1.

FIG. 4 is a schematic diagram of the structure of a suspension frame of the suspension system of FIG. 1. As shown in FIG. 4, the suspension frame 20 includes a suspension body 21 and two mounting blocks 22. The two mounting blocks 22 are respectively vertically disposed at two ends of the suspension body 21, and the two mounting blocks 22 and the suspension body 21 are enclosed to form a U-shaped structure. Referring to FIG. 4 and FIG. 2, inside each of the two sliding grooves 11, a sliding rail 13 is disposed. Each sliding rail 13 is disposed with a slider 14, where the slider 14 can be selectively slid along the sliding rail 13. Each of the mounting blocks 22 is fixedly connected with each slider 14. Thus, when the slider 14 is moved up and down along the sliding rail 13, the mounting block 22 is driven to move up and down, thereby driving the suspension frame 20 and the driving wheel 30 to move up and down.

Furthermore, referring to FIG. 4 and FIG. 3, the mounting block 22 is formed with a mounting hole 23. The slider 14 is fixedly connected to the mounting block 22 through a fastener mounted in the mounting hole 23. In this embodiment, the fastener is a screw. Two limit stops 24 for limiting the slider 14 are respectively disposed above and below the mounting hole 23. Thus, when the slider 14 is moved along the sliding rail 13 together with the mounting block 22, the slider 14 is limited to move within a predetermined route by the contact of the limit stops 24 with the top and bottom of the sliding rail 13.

Referring to FIG. 4, a middle portion of the suspension body 21 has a mounting portion 25. The mounting portion 25 has a disk shape, which is for fixing the driving wheel 30. In this embodiment, the driving wheel 30 is a hub motor, the mounting portion 25 is formed with a lead hole 26, and a wire of the driving wheel 30 passes through the lead hole 26. By using the hub motor as the driving wheel 30, a power device, a transmission device, and a brake device are integrated into a hub, so that the structure of a driving portion of the driving wheel 30 is greatly simplified.

Referring to FIG. 4 and FIG. 3, two ends of the mounting portion 25 of the suspension body 21 extend outwardly in a plate shape, and a surface of each of the two plate-shaped ends which faces the fixing frame 10 is disposed with four reinforcing ribs 27. The four reinforcing ribs 27 are disposed to be diverging from two sides of the mounting portion 25, that is, the four reinforcing ribs 27 are disposed on two sides of the mounting portion 25 in a radial manner with the mounting portion 25 as the center, where the reinforcing rib 27 on one of the two sides has the corresponding reinforcing rib 27 on the other of the two sides which is in a straight line with each other. The four reinforcing ribs 27 have a certain height and are inclined at a predetermined angle with respect to the mounting portion 25. Such a structural design ensures the strength of the suspension body 21 while reducing the mass, and provides a guarantee for the stable support of the driving wheel 30.

Referring to FIG. 2 and FIG. 3, in this embodiment, the U-shaped fixing frame 10 includes a top plate 15, a bottom plate 16, and a plurality of connecting posts 17. The top plate 15 is horizontally disposed, which has a U-shaped cross section. The bottom plate 16 is also horizontally disposed, which also has a U-shaped cross section. The plurality of connecting posts 17 are vertically disposed with an interval therebetween to support between the top plate 15 and the bottom plate 16. Each of two ends of the top plate 15 is connected to one of two ends of the bottom plate 16 through a connecting block 18 which is vertically disposed, and the two sliding grooves 11 are respectively formed at inner sides of the two connecting blocks 18.

Furthermore, an inner wall of the top plate 15 and an inner wall of the bottom plate 16 at the two ends of the fixing frame 10 are respectively disposed with cushions 19. The two cushions 19 provide anti-collision protection between the slider 14 and the top plate 15 as well as the bottom plate 16 to avoid the damage of the slider 14 caused by direct collision.

In this embodiment, an end surface of each of the mounting blocks 22 which faces the fixing frame 10 is disposed with a first mounting post 28, and a rear surface of each of the connecting blocks 18 which is away from the suspension frame 20 is disposed with a second mounting post 181. The elastic member 12 is disposed obliquely with respect to the fixing frame 10 and the suspension frame 20, and one end of the elastic member 12 is fixed on the first mounting post 28, while the other end of the elastic member 12 is fixed on the second mounting post 181.

In this embodiment, the amount of the first mounting posts 28 is two, and the two first mounting posts 28 are disposed to have an interval between the upper first mounting posts 28 and the lower first mounting posts 28; the amount of the second mounting posts 181 is also two, and the two second mounting posts 181 are disposed to have an interval between the upper second mounting posts 181 and the lower second mounting posts 181. Referring to FIG. 1, one end of the elastic member 12 is connected to the upper first mounting post 28 on the suspension frame 20, and the other end of the elastic member 12 is connected to the lower second mounting post 181 on the fixing frame 10, due to the gravity of the robot 60 on which the suspension system S is disposed, the elastic member 12 is in a stretched state, in this case, the elastic member 12 can be a tension spring. Conversely, if one end of the elastic member 12 is connected to the lower first mounting post 28 on the suspension frame 20, and the other end of the elastic member 12 is connected to the upper second mounting post 181 on the fixing frame 10, due to the gravity of the robot 60 on which the suspension system S is disposed, the elastic member 12 is in a compressed state. In this case, the elastic member 12 can be a compressed spring.

Figure 5:
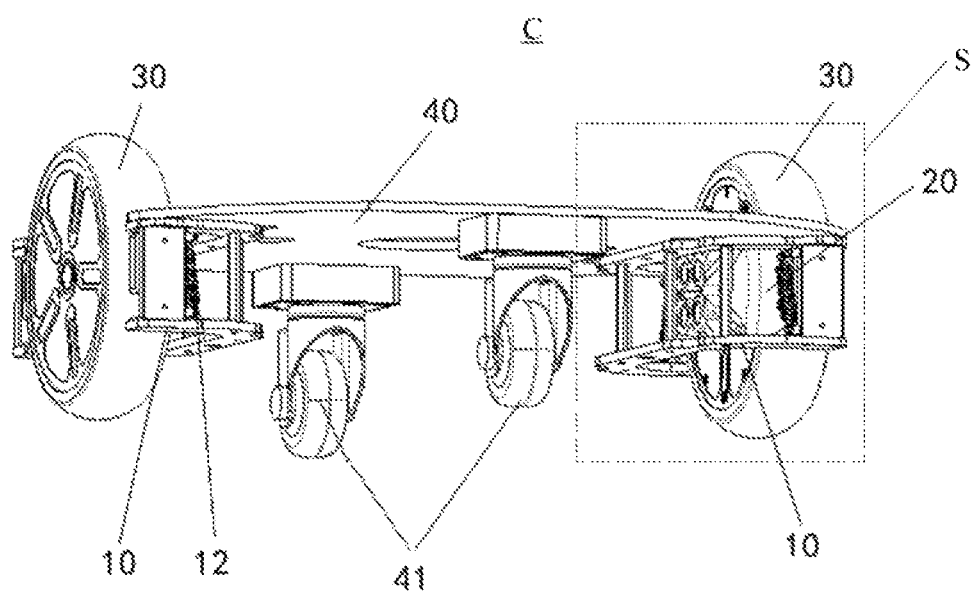
FIG. 5 is a schematic diagram of the structure of a chassis according to an embodiment of the present disclosure.

FIG. 5 is a schematic diagram of the structure of a chassis C according to an embodiment of the present disclosure. As shown in FIG. 5, a chassis C includes a chassis bracket 40, and a left side and a right side of the chassis bracket 40 are respectively disposed with the above-mentioned suspension system S. In this embodiment, the fixing frame 10 of the suspension system S is fixed with the chassis bracket 40.

Under the chassis bracket 40 is disposed with a universal wheel 41. The driving wheel 30 in the suspension system S is only movable in a vertical direction with respect to the chassis bracket 40.

FIG. 6 is a schematic diagram of the structure of the robot 60 according to an embodiment of the present disclosure. As shown in FIG. 6, the robot 60 is provided. The robot 60 is disposed with the above-mentioned the chassis C with the above-mentioned suspension system S. When the chassis C is applied to the robot 60, the weight of the robot 60 causes a pressure on the chassis bracket 40, and the chassis bracket 40 drives the fixing frame 10 to move downward with respect to the suspension frame 20 under the effect of gravity. In this case, the elastic member 12 is stretched. Through the elastic adjustment effect and oblique disposing of the elastic member 12, the chassis bracket 40 can operate equivalent to the ordinary four-wheel chassis when the robot 60 walks on a flat ground, and the suspension frame 20 and the driving wheel 30 are driven to move up with a slope or move down with a pit through the elastic adjustment effect of the elastic member 12 so that the driving wheel 30 can always be attached to the ground without hanging and slipping when the robot encounters a rough road. Moreover, the application of the suspension system S makes the robot walk more smoothly and can withstand a certain rapid deceleration, which adapts to the need for the walking of the robots with high gravity center and is free from robot dumping accidents. In other embodiments, the robot can also dispose with the above-mentioned suspension system S through other structures. In this case, the above-mentioned effect can also be achieved.

The forgoing is only the embodiments of the present disclosure, and is not intended to limit the present disclosure. Any modifications, equivalent substitutions and improvements made within the spirit and principles of the present disclosure should be within the protection scope of the present disclosure.

What is claimed is:

1. A suspension system, comprising:
a fixing frame having an opening;
a suspension frame disposed at the opening; and
a driving wheel rotationally coupled to the suspension frame;
wherein, two ends of the suspension frame are respectively disposed on two ends of the fixing frame at two sides of the opening to be selectively moved up and down along a height direction of the fixing frame, and two elastic members are respectively disposed between each of the two ends of the suspension frame and the corresponding end of the fixing frame at the two sides of the opening;
wherein the suspension frame comprises:
a suspension body connected to the driving wheel; and
two mounting blocks respectively disposed at two ends of the suspension body and enclosed with the suspension body to form a U-shape;
wherein each of the two ends of the fixing frame are disposed with a sliding rail, each of the sliding rails is disposed with a slider to be selectively slid along the sliding rail, and each of the mounting blocks is fixedly connected with each of the sliders.

2. The system of claim 1, wherein a middle portion of the suspension body has a mounting portion connected to the driving wheel, and a surface of the suspension body facing the fixing frame is disposed with a plurality of reinforcing ribs, the plurality of reinforcing ribs are disposed to be diverging from two sides of the mounting portion.

3. The system of claim 2, wherein the driving wheel is a hub motor, the mounting portion is formed with a lead hole, and a wire of the hub motor passes through the lead hole.

4. The system of claim 1, wherein the mounting block is formed with a mounting hole, and the slider is fixedly connected to the mounting block through a fastener mounted in the mounting hole, and two limit stops for limiting the slider are respectively disposed above and below the mounting hole.

5. The system of claim 1, wherein the fixing frame comprises a top plate having a U-shaped cross section, a bottom plate having a U-shaped cross section, and a plurality of connecting posts vertically connected between the top plate and the bottom plate, the top plate, the bottom plate and the plurality of connecting posts are enclosed to form a U-shaped structure having the opening, each of two ends of the top plate is connected to one of two ends of the bottom plate through a vertically disposed connecting block, and a sliding groove is formed at an inner side of the connecting block.

6. The system of claim 5, wherein an inner wall of the top plate and an inner wall of the bottom plate at the two ends of the fixing frame are respectively disposed with cushions for protecting the slider.

7. The system of claim 5, wherein an end surface of each of the mounting blocks facing the fixing frame is disposed with a first mounting post; a rear surface of each of the connecting blocks away from the suspension frame is disposed with a second mounting post; the elastic member is disposed obliquely with respect to the fixing frame and the suspension frame, one end of the elastic member is fixed on the first mounting post, and the other end of the elastic member is fixed on the second mounting post.

8. A chassis, comprising a chassis bracket, wherein under the chassis bracket is disposed with a universal wheel, and two opposite sides of the chassis bracket are respectively disposed with a suspension system comprising:
a fixing frame having an opening;
a suspension frame disposed at the opening; and
a driving wheel rotationally coupled to the suspension frame;
wherein, two ends of the suspension frame are respectively disposed on two ends of the fixing frame at two sides of the opening to be selectively moved up and down along a height direction of the fixing frame, and two elastic members are respectively disposed between each of the two ends of the suspension frame and the corresponding end of the fixing frame at the two sides of the opening;
wherein the suspension frame comprises:
a suspension body connected to the driving wheel; and
two mounting blocks respectively disposed at two ends of the suspension body and enclosed with the suspension body to form a U-shape;
wherein each of the two ends of the fixing frame are disposed with a sliding rail, each of the sliding rails is disposed with a slider to be selectively slid along the sliding rail, and each of the mounting blocks is fixedly connected with each of the sliders.

9. The chassis of claim 8, wherein a middle portion of the suspension body has a mounting portion connected to the driving wheel, and a surface of the suspension body facing the fixing frame is disposed with a plurality of reinforcing ribs, the plurality of reinforcing ribs are disposed to be diverging from two sides of the mounting portion.

10. The chassis of claim 9, wherein the driving wheel is a hub motor, the mounting portion is formed with a lead hole, and a wire of the hub motor passes through the lead hole.

11. The chassis of claim 8, wherein the mounting block is formed with a mounting hole, and the slider is fixedly connected to the mounting block through a fastener mounted in the mounting hole, and two limit stops for limiting the slider are respectively disposed above and below the mounting hole.

12. The chassis of claim 8, wherein the fixing frame comprises a top plate having a U-shaped cross section, a bottom plate having a U-shaped cross section, and a plurality of connecting posts vertically connected between the top plate and the bottom plate, the top plate, the bottom plate and the plurality of connecting posts are enclosed to form a U-shaped structure having the opening, each of two ends of the top plate is connected to one of two ends of the bottom plate through a vertically disposed connecting block, and a sliding groove is formed at an inner side of the connecting block.

13. The chassis of claim 12, wherein an inner wall of the top plate and an inner wall of the bottom plate at the two ends of the fixing frame are respectively disposed with cushions for protecting the slider.

14. The chassis of claim 12, wherein an end surface of each of the mounting blocks facing the fixing frame is disposed with a first mounting post; a rear surface of each of the connecting blocks away from the suspension frame is disposed with a second mounting post; the elastic member is disposed obliquely with respect to the fixing frame and the suspension frame, one end of the elastic member is fixed on the first mounting post, and the other end of the elastic member is fixed on the second mounting post.

15. A robot having a chassis, wherein the chassis comprises a chassis bracket, under the chassis bracket is disposed with a universal wheel, and two opposite sides of the chassis bracket are respectively disposed with a suspension system comprising: a fixing frame having an opening;

a suspension frame disposed at the opening; and a driving wheel rotationally coupled to the suspension frame;

wherein, two ends of the suspension frame are respectively disposed on two ends of the fixing frame at two sides of the opening to be selectively moved up and down along a height direction of the fixing frame, and two elastic members are respectively disposed between each of the two ends of the suspension frame and the corresponding end of the fixing frame at the two sides of the opening;

wherein the suspension frame comprises:

a suspension body connected to the driving wheel; and two mounting blocks respectively disposed at two ends of the suspension body and enclosed with the suspension body to form a U-shape;

wherein each of the two ends of the fixing frame are disposed with a sliding rail, each of the sliding rails is disposed with a slider to be selectively slid along the sliding rail, and each of the mounting blocks is fixedly connected with each of the sliders.

16. The robot of claim 15, wherein a middle portion of the suspension body has a mounting portion connected to the driving wheel, and a surface of the suspension body facing the fixing frame is disposed with a plurality of reinforcing ribs, the plurality of reinforcing ribs are disposed to be diverging from two sides of the mounting portion.

17. The robot of claim 16, wherein the driving wheel is a hub motor, the mounting portion is formed with a lead hole, and a wire of the hub motor passes through the lead hole.

* * * * *